United States Patent [19]

DuBois

[11] Patent Number: 5,073,610

[45] Date of Patent: * Dec. 17, 1991

[54] POLYMERS OF ALKOXYSTYRENES AND A PROCESS TO PRODUCE POLYMERS OF ALKOXYSTYRENES

[75] Inventor: Donn A. DuBois, Houston, Tex.

[73] Assignee: Shell Oil Company, Houston, Tex.

[*] Notice: The portion of the term of this patent subsequent to Nov. 26, 2008 has been disclaimed.

[21] Appl. No.: 589,364

[22] Filed: Sep. 28, 1990

[51] Int. Cl.$^5$ .............................................. C08F 4/16
[52] U.S. Cl. .................................. 526/194; 526/332; 526/334; 526/346
[58] Field of Search ............... 526/194, 332, 334, 346

[56] References Cited

U.S. PATENT DOCUMENTS

| | | | |
|---|---|---|---|
| 2,882,244 | 4/1959 | Milton | 252/455 |
| 3,228,923 | 1/1966 | Scott et al. | 260/91.1 |
| 3,365,433 | 1/1968 | Manson et al. | 260/91.1 |
| 3,394,116 | 7/1968 | Sorkin | 260/91.1 |
| 3,461,075 | 8/1969 | Manson et al. | 252/301.3 |
| 3,616,369 | 10/1971 | Williams | 526/308 |
| 3,819,596 | 6/1974 | Gross | 260/91.1 M |
| 4,543,397 | 9/1985 | Woods | 526/301 |

FOREIGN PATENT DOCUMENTS

| | | |
|---|---|---|
| 74004055 | 1/1974 | Japan . |
| 096195/13 | 2/1989 | Japan . |
| 1561968 | 3/1980 | United Kingdom . |

OTHER PUBLICATIONS

"Living Cationic Polymerization of P-Methoxystyrene by Hydrogen . . . ", Higashimura et al., Polymer Bulletin, 19, 7-11, 1988.

"Hydrogen Iodide/Zinc Iodide: A New Initiating System for Living Cationic . . . ", Sawamoto et al., Macromolecules, 1987, 20, 2693-2697.

"Mechanism of Living Polymerization of Vinyl Ethers by the Hydrogen Iodide . . . ", Higashimura et al., Macromolecules, 1985, 18, 611-616.

"Synthesis of Monodisperse Living Poly(vinyl ethers) and Block Copolymers . . . ", Miyamoto et al., Macromolecules, 1984, 17, 2228-2230.

"Synthesis of P-Methoxystyrene-Isobutyl Vinyl Ether Block Copolymers by Living Cationic . . . ", Higashimura et al., Macromolecules, 1979.

*Primary Examiner*—Joseph L. Schofer
*Assistant Examiner*—Fred Zitomer
*Attorney, Agent, or Firm*—James O. Okorafor

[57] ABSTRACT

A process to polymerize alkoxystyrenes utilizing a zeolite as the initiator is provided. Polymers of p-methoxystyrene having number average molecular weights in excess of $1 \times 10^6$ are prepared by room temperature polymerization. The invention also provides a high molecular weight polymer of alkoxystyrenes which has a broad molecular weight distribution.

20 Claims, No Drawings

POLYMERS OF ALKOXYSTYRENES AND A PROCESS TO PRODUCE POLYMERS OF ALKOXYSTYRENES

FIELD OF THE INVENTION

This invention relates to new polymers of alkoxystyrenes, and to a process to produce these polymers.

BACKGROUND OF THE INVENTION

Alkoxystyrenes such as p-methoxystyrene (PMOS) may be polymerized by free radical, cationic or anionic methods, but each of the known methods has drawbacks. Further, very high molecular weight polymers can not be produced by the known methods.

Anionic polymerization of alkoxystyrenes are subject to termination reactions, and generally result in only oligomers, or at best, low molecular weight polymers.

Free radical polymerization of alkoxystyrenes are subject to the typical free radical termination reactions of combination and disproportionation.

Cationic polymerization of alkoxystyrene can be performed utilizing a iodide ion containing initiator with a coinitiator of a divalent metal iodide or as described by Higashmimura et al. in "Living Cationic Polymerization of p-methylstyrene by Hydrogen Iodide/Zinc Iodide at Room Temperature," *Polymer Bulletin*, 19, 7-11 (1988). Living polymers are produced. But the preferred zinc iodide coinitiators are toxic and difficult to separate from the polymer. If the zinc iodide is not removed from the polymer, it imparts an unacceptable color.

Each of these known processes involve utilization of initiators which are soluble in the polymerization mediums. Process steps are required to remove the initiators and these process steps are typically energy intensive.

The objects of this invention are therefore to provide a process to polymerize alkoxystyrenes polymers, the process utilizing a heterogeneous and non-toxic initiator system. It is a further object of this invention to provide a high molecular weight polymer comprising alkoxystyrene monomer units, the polymer having a broad molecular weight distribution.

SUMMARY OF THE INVENTION

The object of the present invention are accomplished by a process comprising the steps of contacting an alkoxystyrene monomer with a zeolite under polymerization conditions, and recovering an alkoxystyrene polymer. The polymerization is preferably carried out in an inert solvent, and the preferred zeolite is a 13X zeolite. Polymers having broad molecular weight distributions, and number average molecular weights above $1 \times 10^6$ can be prepared by this process. Because the zeolite initiator is a solid, it is readily removed from the polymer produced by this process.

In another aspect, this invention provides a high molecular weight alkoxystyrene polymer. The number average molecular weight of this polymer is preferably over 500,000 and the preferred alkoxystyrene is methoxystyrene. Most preferably, the methoxystyrene is p-methoxystyrene. These polymers are useful in sealant, adhesive and coating compositions, and they are particularly useful for elevated service temperatures due to the high glass transition temperature of these polymers. These polymers also have high tensile strength, good adhesion to polar substrates, good solvent resistance and excellent compatability with aromatic and polar polymers.

DETAILED DESCRIPTION OF THE INVENTION

The alkoxystyrene which may be polymerized by the process of this invention include those of the formula:

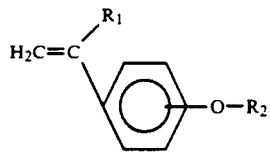

where $R_1$ is a hydrogen or an alkyl group and $R_2$ is an alkyl group. $R_1$ is preferably hydrogen. $R_2$ is preferably alkyl having one to ten carbon atoms, and more preferably a methyl group such as a methoxystyrene and p-methoxystyrene. $R_2$ is most preferably in the para position.

Other monomers which are polymerizable utilizing zeolites as initiators may also be present and copolymerized with the alkoxystyrene. Vinyl ethers, for example, may be copolymerized with the alkoxystyrenes.

The polymerization of the present invention is preferably performed in an inert solvent. Aromatic hydrocarbon solvents are preferred due to the excellent solubility of the alkoxystyrene polymers in aromatic solvents. This permits polymerization with a minimal amount of solvent present, which minimizes the cost of solvent removal. The solvent is preferably present in an amount of between 1 and 50 weight percent of the total monomers present, and more preferably between about 1 and 20 weight percent. Aromatic solvents which are preferred include toluene, benzene and xylenes. The solvent may be any suitable solvent for the alkoxystyrene which is inert toward alkoxystyrene and the zeolite. Solvents which are not suitable solvents for the polymers produced may be utilized, but are not preferred because of the difficulty of separating the polymers produced from the solid zeolite initiators.

Zeolites which have acid sites are effective as the cocatalysts of this invention. Acidity is typically introduced by the decomposition of the $NH_4+$ ion-exchange form, by hydrogen-ion exchange, and by hydrolysis of zeolite containing multivalent cations during hydrogenation.

A wide variety of acid site containing zeolites may be utilized as the cocatalysts of this invention. The zeolites can include both synthetic and naturally occurring zeolites. Illustrative of the synthetic zeolites are Zeolite X, U.S. Pat. Nos. 2,882,244; Zeolite Y, 3,130,007; Zeolite A, 2,882,243; Zeolite L, Bel. 575,117; Zeolite D, Can. 611,981; Zeolite R, 3,030,181; Zeolite S, 3,054,657; Zeolite T, 2,950,952; Zeolite Z, Can. 614,995; Zeolite E, Can. 636,931; Zeolite F, 2,995,358; Zeolite O, 3,140,252; Zeolite W, 3,008,803; Zeolite Q, 2,991,151; Zeolite M, 2,995,423; Zeolite H, 3,010,789; Zeolite J, 3,001,869; Zeolite W, 3,012,853; Zeolite KG, 3,056,654; Zeolite SL, Dutch 6,710,729; Zeolite Omega, Can. 817,915; Zeolite ZK-5, 3,247,195; Zeolite Beta, 3,308,069; Zeolite EU-1, 4,537,754; Zeolite ZK-4, 3,314,752; Zeolite ZSM-5, 3,702,886; Zeolite ZSM-11, 3,709,979; Zeolite ZSM-12, 3,832,449; Zeolite ZSM-20, 3,972,983; Zeolite ZSM-35, 4,016,245; Zeolite ZSM-50, 4,640,829; synthetic mordenite; the so-called ultrastable zeolites of U.S. Pat. Nos. 3,293,192 and 3,449,070; and the references cited therein, incorporated herein by reference. Other acceptable synthetic zeolites are described in the book "Zeolite Molecular Sieves-Structure, Chemistry and Use," by Donald W. Breck, 1974, John Wiley & Sons, incorporated by reference herein. Illustrative of the acceptable naturally occurring crystalline zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, heulandite, laumontite, levynite, offretite, and yugawaralite. Descriptions of certain acceptable naturally occuring zeolites are found in the aforementioned book by Breck, and in the book "Molecular Sieves-Principles of Synthesis and Identification", by R. Szostak, Van Nostrand Reinhold, New York, 1989, incorporated by reference herein. These zeolites may be in the hydrogen form or may be partially or fully exchanged with ammonium or metal ions.

The zeolites which are preferred are faujasites, which include synthetic zeolites such as zeolite X and zeolite Y. A zeolite X, which is a crystalline sodium aluminosilicate with pores or channels of approximately 13 Angstrom units in diameter is available commercially as Molecular Sieve 13X. This zeolite is most preferred. The 13X material contains water and has the unit cell formula

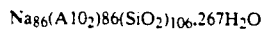

$$Na_{86}(AlO_2)_{86}(SiO_2)_{106}.267H_2O$$

The parent zeolite should be dehydrated to make the active catalyst. A synthetic zeolite known as Molecular Sieve 10X is a crystalline aluminosilicate salt having channels above 10 Angstrom units in diameter and in which a substantial proportion of the sodium ions of the 13X material have been replaced by calcium.

The amount of zeolite which is present for the polymerization of this invention is preferably between about 0.1 and about 10 grams per mole of monomers, and more preferably, about 0.25 to about 1.

Higher ratios of zeolite to monomer result in more rapid polymerization.

In general, the polymerization of this invention may be carried out in batch, continuous or semi-continuous operations. The nominal residence time under polymerization conditions will preferably range from about 0.5 to about 24 hours. The reaction is complete after essentially all monomer, i.e. about 99 percent or more, is converted to polymer.

The polymerization reaction of this invention can be accomplished at a temperature within the range from about −80° to about 200° C. in hydrocarbon, etheral or halogenated hydrocarbon solvents that do not contain acidic hydrogens and which are inert to the reagents used. The temperature is preferably between about 0° and about 30° C. The pressure employed is not critical and essentially any pressure may be employed while atmospheric pressure is particularly effective. Agitation of the zeolite-monomer-solvent mixture during the polymerization is preferred in order to maintain contact between the dissolved monomers and the zeolite solids.

Polymerization of the alkoxystyrenes is most advantageously performed without any other polymerization initiators present. The presence of cationic initiators result in a polymer that has a narrower molecular weight distribution and a generally lower molecular weight. The absence of these cationic initiators is necessary for high molecular weight polymers to be produced.

The polymer produced by the process of this invention is preferably a high molecular weight polymer, with a weight average molecular weight in excess of about $10^3$ g/mol. More preferably, the weight average molecular weight is between about $10^3$ and about $10^6$. The high molecular weight polymers have higher tensile strengths, better solvent resistance and higher service temperatures.

EXAMPLE 1 p-Methoxystyrene was polymerized utilizing a 5A zeolite. A 125 ml flask equipped with a magnetic stirrer and a rubber septum was charged with 100 ml of toluene, as solvent, and 3.0 grams of p-methoxystyrene monomer. One gram of zeolite 5A was then added and polymerization continued at 25° C. for 17 hours. Samples of reaction solution were periodically withdrawn, and the extent of reaction was determined. The extent of the reaction was determined by gas chromatography comparing monomer in the initial solution and the final solution. After 17 hours, the extent of the reaction was 22.7%. The number average molecular weight of the polymer produced was determined to be in excess of $1.0 \times 10^6$ by gel permentation chromotography (GPC). Due to the width of the GPC peak, the molecular weight distribution (Mw/Mn) could not be determined with precision but was clearly in excess of 10.

This example demonstrates the capability of 5A zeolites to polymeric alkoxystyrenes to high molecular weight polymers, however the catalyst does not allow for high monomer conversion.

EXAMPLE 2 p-Methoxystyrene was polymerized utilizing a 13X zeolite as a polymerization initiator. Example 1 was repeated with the exception that 1 gram of 13X zeolite was substituted for the 5A zeolite, and polymerization continued for 6 hours.

The p-methoxystyrene was greater than 99 percent polymerized after 6 hours, and GPC analysis indicated that the number average molecular weight of the polymer produced was about 33,000 and that the weight average molecular weight was about 210,000.

This example demonstrates that on an equal weight basis, 13X zeolite will cause alkoxystyrenes to be polymerized more rapidly and to lower molecular weight polymers than 5A zeolites.

EXAMPLE 3 p-Methoxystyrene was polymerized to a high molecular weight polymer utilizing a 13X zeolite as a polymerization initiator. The procedure of Example 1 was repeated utilizing 50 grams of toluene, 3.9 grams of p-methoxystyrene and 1.9 grams of 13X zeolite identical to that utilized in Example 2. Polymerization was complete within 5 hours, and the number average molecular weight of the polymer produced was greater than about $1 \times 10^6$.

This example demonstrates that higher molecular weight polymers can be produced by the process of this invention at higher concentration of monomer in the solvent, and with a larger weight ratio of zeolite to monomer.

COMPARATIVE EXAMPLE

Polymerization of styrene utilizing a 13X zeolite as an initiator was unsuccessfully attempted. The procedure of Example 1 was repeated utilizing 3.3 grams of styrene, and one gram of 13X zeolite. After 48 hours conversion of styrene was less than 5 percent, and the polymerization was then stopped.

This example demonstrates that styrene is not effectively polymerized by the process of this invention.

I claim:

1. A process to polymerize alkoxystyrenes comprising the steps of:
   a) contacting an alkoxystyrene monomer with a zeolite under polymerization conditions; and
   b) recovering an alkoxystyrene polymer.
2. The process of claim 1 wherein the alkoxystyrene is a methoxystyrene.
3. The process of claim 2 wherein the methoxystyrene is p-methoxystyrene.
4. The process of claim 2 wherein the methoxystyrene is α-methoxystyrene.
5. The process of claim 1 wherein the alkoxystyrene and zeolite are contacted with the alkoxystyrene dissolved in a solvent which is inert to zeolites and the alkoxystyrene.
6. The process of claim 1 wherein the alkoxystyrene and the zeolite are contacted without another polymerization initiator present.
7. The process of claim 1 wherein the alkoxystyrene polymer has a weight average molecular weight of about 10,000 or greater.
8. The process of claim 1 wherein the zeolite is a faujasite.
9. The process of claim 8 wherein the faujasite zeolite is a zeolite X.
10. The process of claim 9 wherein the zeolite X is a 13X zeolite.
11. The process of claim 1 wherein the weight ratio of alkoxystyrene to zeolite is within the range of about 200 to about 1.
12. The process of claim 1 wherein the weight ratio of alkoxystyrene to zeolite is within the range of about 50 to about 1.
13. The process of claim 1 wherein greater than about 98 weight percent of the alkoxystyrene monomer is polymerized.
14. The process of claim 10 wherein the weight ratio of alkoxystyrene to zeolite is within the range of about 200 to about 1.
15. The process of claim 14 wherein the alkoxystyrene is methoxystyrene.
16. The process of claim 15 wherein the methoxystyrene is p-methoxystyrene.
17. The process of claim 16 wherein the p-methoxystyrene and 13X zeolite are contacted with the p-methoxystyrene dissolved in an inert solvent.
18. The process of claim 12 wherein greater than about 98 percent of the p-methoxystyrene is polymerized.
19. The process of claim 18 wherein the p-methoxystyrene and the 13X zeolite are contacted without another polymerization initiator present.
20. A polymer comprising alkoxystyrene monomer units having a number average molecular weight of about 1,000,000 or greater.

* * * * *